US012187908B2

(12) United States Patent
Dustin et al.

(10) Patent No.: US 12,187,908 B2
(45) Date of Patent: Jan. 7, 2025

(54) PHTHALONITRILE-BASED HIGH TEMPERATURE RESISTIVE INKS

(71) Applicant: The Boeing Company, Chicago, IL (US)

(72) Inventors: Ashley M. Dustin, Santa Monica, CA (US); Xin Guan, Brea, CA (US); Michael J. Ventuleth, Camarillo, CA (US); Andrew P. Nowak, Los Angeles, CA (US); Shahriar Alam, Chandler, AZ (US); Stella Fors, Chicago, IL (US)

(73) Assignee: The Boeing Company, Arlington, VA (US)

(*) Notice: Subject to any disclaimer, the term of this patent is extended or adjusted under 35 U.S.C. 154(b) by 311 days.

(21) Appl. No.: 17/451,403

(22) Filed: Oct. 19, 2021

(65) Prior Publication Data

US 2022/0119665 A1    Apr. 21, 2022

Related U.S. Application Data (60) Provisional application No. 63/094,201, filed on Oct. 20, 2020.

(51) Int. Cl.
| | | |
|---|---|---|
| *C09D 11/52* | (2014.01) | |
| *C08G 73/02* | (2006.01) | |
| *C08K 3/04* | (2006.01) | |
| *C09D 11/101* | (2014.01) | |
| *C09D 11/102* | (2014.01) | |

(Continued)

(52) U.S. Cl.
CPC ............ *C09D 11/52* (2013.01); *C08G 73/024* (2013.01); *C08K 3/04* (2013.01); *C09D 11/101* (2013.01); *C09D 11/102* (2013.01); *C09D 11/36* (2013.01); *C09D 11/38* (2013.01); *C09D 135/04* (2013.01); *C08K 2201/001* (2013.01)

(58) Field of Classification Search
None
See application file for complete search history.

(56) References Cited

U.S. PATENT DOCUMENTS

| 5,242,755 A | 2/1993 | Keller et al. |
|---|---|---|
| 7,037,447 B1 | 5/2006 | Yang et al. |

(Continued)

FOREIGN PATENT DOCUMENTS

| CN | 102272234 A | 12/2011 |
|---|---|---|
| CN | 102318100 A | 1/2012 |

(Continued)

OTHER PUBLICATIONS

ISA European Patent Office, International Search Report Issued in Application No. PCT/US2021/071928, Feb. 18, 2022, WIPO, 10 pages.

(Continued)

*Primary Examiner* — Katie L. Hammer
(74) *Attorney, Agent, or Firm* — Alleman Hall & Tuttle LLP (57) ABSTRACT

Resistive inks and method of making resistive inks that utilize a phthalonitrile resin as a curable component in the inks are disclosed. In one example, a resistive ink is provided. The resistive ink comprises a solvent, a thermally-curable phthalonitrile-based resin dissolved in the solvent, and one or more conductive fillers. In some examples, the phthalonitrile resin can comprise a B-staged material.

20 Claims, 6 Drawing Sheets

(51) Int. Cl.
   *C09D 11/36*   (2014.01)
   *C09D 11/38*   (2014.01)
   *C09D 135/04*  (2006.01)

(56) References Cited

U.S. PATENT DOCUMENTS

| | | | |
|---|---|---|---|
| 7,211,205 | B2 | 5/2007 | Conaghan et al. |
| 8,921,510 | B1 | 12/2014 | Keller et al. |
| 2006/0194944 | A1 | 8/2006 | Fowler et al. |
| 2008/0145559 | A1 | 6/2008 | Banning |
| 2010/0000441 | A1 | 1/2010 | Jang et al. |
| 2014/0039151 | A1 | 2/2014 | Keller et al. |
| 2015/0083474 | A1* | 3/2015 | Kawamura ............ H05K 1/097 252/514 |
| 2015/0267022 | A1* | 9/2015 | Hu ........................ B32B 17/066 521/110 |
| 2016/0168326 | A1 | 6/2016 | Laskoski et al. |
| 2016/0369040 | A1* | 12/2016 | Das ........................ C08L 63/00 |
| 2017/0002146 | A1 | 1/2017 | Keller et al. |
| 2019/0055338 | A1* | 2/2019 | Anderson ............. C07C 323/32 |

FOREIGN PATENT DOCUMENTS

| | | |
|---|---|---|
| CN | 104093796 A | 10/2014 |
| CN | 104861909 A | 8/2015 |
| CN | 105585903 A | 5/2016 |
| CN | 109071805 A | 12/2018 |
| CN | 110272374 A | 9/2019 |
| CN | 111492017 A | 8/2020 |
| EP | 3705541 A1 | 9/2020 |
| WO | 2011126704 A3 | 10/2011 |
| WO | 2011126706 A3 | 10/2011 |
| WO | 2013157514 A1 | 10/2013 |
| WO | 2014113937 A1 | 7/2014 |
| WO | 2017028640 A1 | 2/2017 |
| WO | 2018175025 A1 | 9/2018 |
| WO | 2020092507 A2 | 5/2020 |

OTHER PUBLICATIONS

China National Intellectual Property Administration, Office Action and Search Report Issued in Application No. 202180071401.4, Feb. 21, 2024, 9 pages.
China National Intellectual Property Administration, Office Action Issued in Application No. 202180071401.4, Aug. 28, 2024, 13 pages.
China National Intellectual Property Administration, Search Report Issued in Application No. 202180071401.4, Aug. 28, 2024, 4 pages.
Zhang, H. et al., "Synthesis and properties of cross-linkable poly (aryl ether ketone) oligomers terminated with phthalonitrile group," High Performance Polymers, vol. 26, No. 8, May 27, 2014, 9 pages.

\* cited by examiner

PHTHALONITRILE-BASED HIGH TEMPERATURE RESISTIVE INKS

CROSS REFERENCE TO RELATED APPLICATIONS

This application claims priority to U.S. Patent Application Ser. No. 63/094,201, filed Oct. 20, 2020, the entirety of which is hereby incorporated herein by reference for all purposes.

FIELD

This disclosure relates to compositions of resistive inks, films formed by such inks, and methods of making resistive inks and films from resistive inks.

BACKGROUND

Resistive inks can be used to print electrically resistive films for many applications. However, current resistive inks can be unstable at high temperatures, can be expensive, and can have shear properties that are limiting in certain applications. Further, many resistive inks contain metallic fillers, which can pose processing challenges and limit the use of such resistive inks in certain applications. As such, there is a need for more robust and widely-applicable high temperature-resistant resistive inks.

SUMMARY

Examples are disclosed that relate to resistive inks and method of making resistive inks that utilize a phthalonitrile resin as a curable component in the inks. According to one aspect of the present disclosure, a resistive ink is provided. The resistive ink comprises a solvent, a thermally-curable phthalonitrile-based resin dissolved in the solvent, and one or more conductive fillers. In some examples, the phthalonitrile resin can comprise a B-staged material.

According to another aspect of the present disclosure, an article is provided, the article comprising a substrate and a resistive film on the substrate. The resistive film comprises a phthalonitrile-based polymer and a conductive filler dispersed in the phthalonitrile-based polymer.

According to another aspect of the present disclosure, a method of making a resistive ink is provided, the method comprising applying heat to initiate a polymerization of a phthalonitrile-based resin, quenching polymerization of the phthalonitrile-based resin before completion of polymerization to form a B-staged phthalonitrile-based resin, and mixing the B-staged phthalonitrile-based resin, a conductive filler, and a solvent to dissolve the phthalonitrile-based resin in the solvent.

The features and functions that have been discussed can be achieved independently in various embodiments or may be combined in yet other embodiments, further details of which can be seen with reference to the following description and drawings.

DETAILED DESCRIPTION

As mentioned above, resistive inks can be used in a wide variety of applications, some of which can involve a printed resistive ink film being exposed to relatively high temperatures (e.g. 200° C. or higher) during ordinary use conditions. Such operating temperatures can potentially damage resistive films printed using some current inks, for example by oxidation due to the elevated temperatures. Also, current resistive inks, such as inks comprising polyimide-based materials in solvents such as methanol or N-methyl-2-pyrrolidone (NMP), can be expensive and can cause degradation of materials used in screen printing processes (e.g. rubber, screen emulsions).

Accordingly, examples are disclosed herein that relate to high-temperature resistive inks that utilize phthalonitrile-based resins as a curable component. The term "curing" is used herein to indicate the change of physical properties of a material via chemical reaction (e.g. by cross-linking, polymer chain lengthening, and/or other mechanism(s)), and the term "curable" indicates the property of being able to undergo such a change. Curing of a curable material may be accomplished via the application of energy (e.g. photonic, thermal, electron beam, etc.) and potentially with the use of one or more catalysts. As described in more detail below, printed films formed using the disclosed phthalonitrile resin-based resistive inks can be more stable against thermal degradation than other types of conductive inks, and thus better suited for high-temperature use. Further, in various examples, the disclosed phthalonitrile-based resistive inks can be made without the addition of common metallic fillers that can be deleterious for some downstream processes and post-processing steps, can be produced via quick setting procedures in which a solvent is quickly evaporated to result in a dry ink surface, and/or can achieve almost an order of magnitude improvement in shear strength compared to current commercial inks.

Phthalonitrile-based resins used in the resistive ink compositions disclosed herein can include a small molecule, an oligomer, a B-staged material (which is a partially cured material, as described in more detail below), or combinations thereof. Any suitable phthalonitrile-based resin can be used. Examples include phthalonitrile-based resins that are soluble in a suitable solvent for an ink composition, and that when polymerized are suitably stable against oxidation in intended use conditions. Suitable phthalonitrile-based resins can include functional groups such as a ketone, an ether, a urethane, a urea, an amide, an imide, an ester, a sulfone, an oxamide, a benzoxazine, a maleimide, and combinations thereof. More specific examples include polyether ether ketone (PEEK)-based phthalonitrile resins, such as a bisphenol A oligomeric phthalonitrile composition and/or a resorcinol oligomeric phthalonitrile composition. Examples of such compositions are available from Chromak Research, Inc. of Somerset, New Jersey Such phthalonitrile compositions are soluble, are thermally curable, and do not exhibit undesirably exothermic cure processes.

Suitable solvents comprise solvents in which a selected phthalonitrile-based resin is soluble. Further, in some examples, suitable solvents include solvents having a boiling point of 200° C. or more. Examples of such solvents include 2-phenoxyethanol, NMP, m-cresol, benzyl alcohol, diphenyl ether, and combinations thereof. The use of such a solvent can help to avoid the solvent evaporating at too low a temperature during processing and in a thermal curing process. This can help to achieve a higher quality film compared to the use of a solvent with a lower boiling point when a thermal curing process is used. For example, it may be desirable to allow for resin mobility during heating, and then have the solvent vaporize and evolve during curing to preserve the morphology achieved by the resin mobility during heating. In some examples, a printed film of a phthalonitrile resin-based ink can be cured at a temperature within a range of 200° C. to 425° C. The use of a relatively higher boiling point solvent (e.g. above 200° C.), such as 2-phenoxyethanol, also can help to reduce solvent loss from evaporation during storage compared to a relatively lower boiling point solvent. In other examples, the solvent can include a material having a boiling point of less than 200° C. Examples include acetone, methyl ethyl ketone (MEK), methyl n-propyl ketone (MPK), methyl isobutyl ketone (MIBK), tetrahydrofuran (THF), n-butyl acetate, chloroform, methylene chloride, carbon tetrachloride, toluene, trichloroethylene, isopropanol, diethyl ether, dimethyl sulfoxide, dimethyl formamide, xylene, and combinations thereof. The use of a solvent having a boiling point of less than 200° C. can provide for an ink that can be dried on a substrate at a lower temperature. In some examples, a solvent can include a mixture of materials with different boiling points.

To provide for electrical conductivity, a resistive ink further includes one or more electrically conductive fillers. In some examples, metallic fillers can be used. Example metallic fillers include, but are not limited to, nickel, silver, copper, gold, platinum, iridium, stainless steel, iron, titanium, zinc, and combinations thereof. In some examples, the use of a metallic filler can provide for a lower resistivity ink than the use of other conductive fillers.

In other examples, non-metallic conductive fillers can be used. The use of a non-metallic conductive filler may allow a resistive ink composition to be used in a wider variety of applications, and can provide for electrical conductivity in applications not suitable for metal-containing inks. Suitable non-metallic conductive fillers include various carbon materials, such as an activated carbon, graphite, short-chopped carbon fiber, graphene, and combinations thereof. A more specific example of a carbon filler is SUPER P carbon black, available from Alfa Aesar of Tewksbury, MA.

Conductive filler particles used in an ink according to the present disclosure can have any suitable average size, size distribution, and shape characteristics. Particle size and size distribution analysis can be performed, for example, using ISO 13320:2020. This method assumes a spherical particle, and is relevant for particles in size ranges from 0.1-3000 microns. For spherical and non-spherical particles, a size distribution can be reported, where the predicted scattering pattern for the volumetric sum of spherical particles matches the measured scattering pattern. As examples, ASTM D4791-19 (Standard Test Method for Flat Particles, Elongated Particles, or Flat and Elongated Particles in Coarse Aggregate), or ASTM D8090-17 (Standard Test Method for Particle Size Distribution and Shape Analysis of Paints and Pigments Using Dynamic Imaging Methods) can be used for determining size distribution and shape characteristics. In some examples, a conductive filler can comprise particles having an aspect ratio of less than 2, such as spherical or elliptical-shaped particles. In other examples, a conductive filler can have an aspect ratio of greater than 2, such as microwire or nanowire-shaped particles. The aspect ratio of a particle can be detected, for example, via a suitable imaging technique, such as scanning electron microscopy. The use of such particles allows a lower loading of particles by mass to be used, as the higher aspect ratio particles can form a conductive network within a cured phthalonitrile resin at lower loadings than particles with lower aspect ratios. In other examples, a conductive filler can have an aspect ratio of lower than 2, which can help to avoid wire entanglement, allowing for easier processing.

The phthalonitrile resin, conductive filler, and solvent each can be included within a conductive ink composition in any suitable amount. Example compositional ranges for the phthalonitrile resin include 10%-40% by weight of the total ink mass. Example compositional ranges for the conductive filler include 10%-40% by weight of the total ink mass. Likewise, example compositional ranges for the solvent include 50%-70% by weight of the total ink mass.

In some examples, various other materials can be used to modify the properties of a conductive ink and/or the properties of a film formed with the conductive ink. For example, fillers in addition to the conductive filler can be used to modify the physical and/or chemical properties of an ink (for example, to thicken the ink or adjust an appearance of a film printed with the ink). Examples of such fillers include inorganic fillers, such as silica, fumed silica, alumina, other oxides, and combinations thereof. Non-conductive organic fillers also can be included in an ink composition according to the present disclosure. Example non-conductive fillers include polyether ether ketones (PEEK), polyether ketone ketones (PEKK), and polyetherimides (e.g. ULTEM available from SABIC Americas, Inc. of Houston, TX). Such inorganic fillers and non-conductive fillers can adjust the conductivity, viscosity, appearance, mechanical strength, and combinations thereof of the finished ink.

Other additives can be included to adjust or provide for properties such as substrate adhesion, thermal stability, rheological characteristics, surface tension, solution stability, and catalytic properties. Such additives can include, for example, a dispersant, a flow agent, a polymerization catalyst, a cure promoter, a surfactant, a flame retardant, and/or viscosity modifier. Suitable additives can include those that impart both high wettability (good contact of the ink solution with the additive and/or substrate) and functionality (compatibility with the resin, fillers, and solvents and ability to form a homogenous mixture without separation) to the ink, matched with the specific surface energy of the substrate to be used. High wettability and functionality can help to ensure chemical adhesion of the ink to the substrate. Any other suitable ink additives alternatively or additionally can be included.

Figure 1:
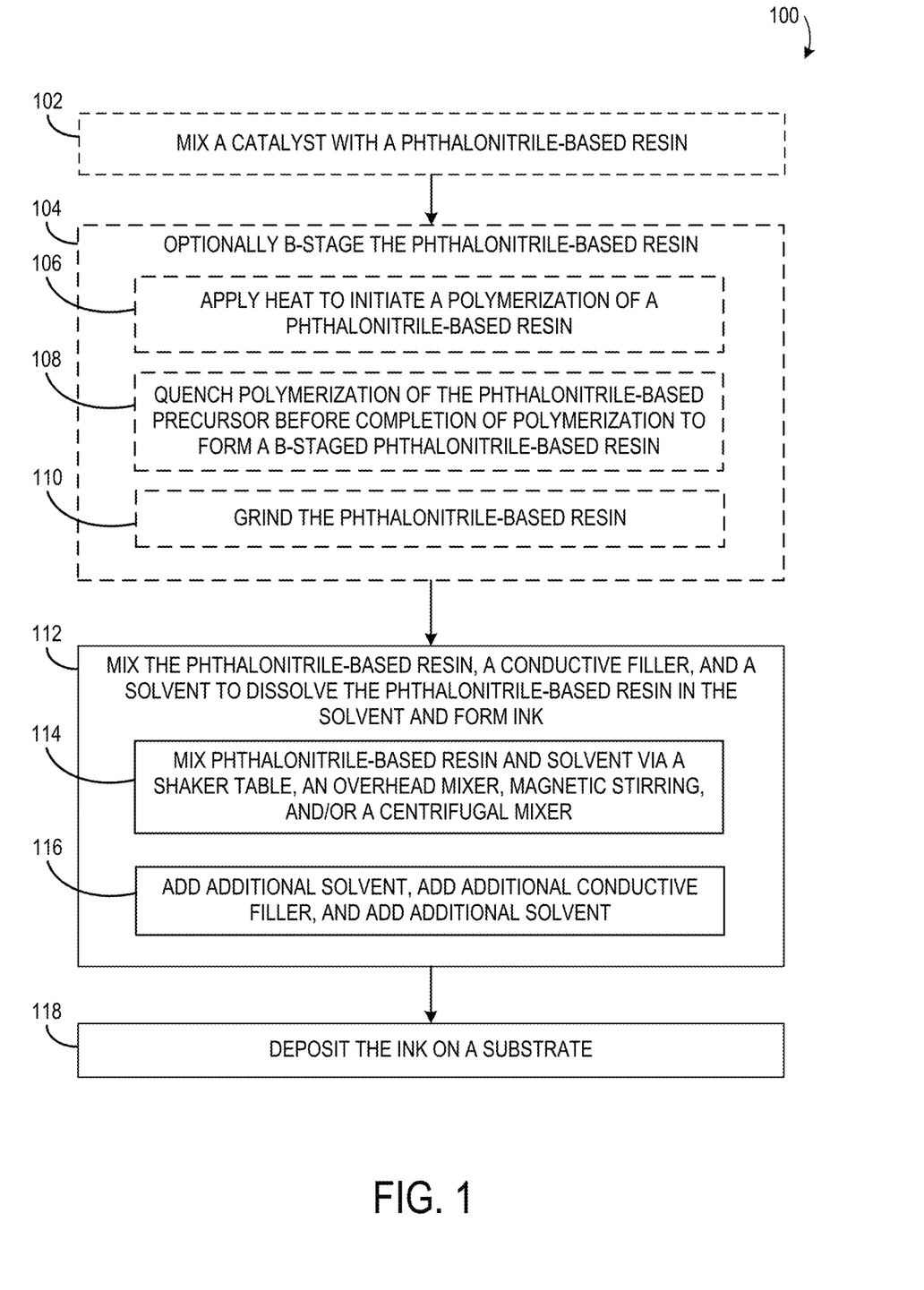
FIG. 1 shows a flow diagram depicting an example method of making a resistive ink.

As mentioned above, in some examples a phthalonitrile resin-based resistive ink according to the present disclosure can comprise a B-staged phthalonitrile resin. A B-staged resin is a resin that is partially polymerized, and can permit curing times to be reduced while still providing for a printable ink with suitable viscosity characteristics. FIG. 1 shows an example method 100 of making a resistive ink that optionally comprises a B-staged resin. Method 100 optionally includes, at 102, mixing a catalyst with a phthalonitrile-based resin. A catalyst can help to lower the activation energy for polymerization and help to cure the phthalonitrile-based resin. Examples of suitable catalysts may include organic catalysts such as amino-functional organic catalysts (e.g. bis[4-(3-aminophenoxy)phenyl] sulfone (m-BAPS), bis[4-(4-aminophenoxy)phenyl] sulfone (p-BAPS), melamine) or phenolic-functional organic catalysts (e.g. hydroxyquinone). Further examples include metallic catalysts such as those that are copper-containing, iron-containing, zinc-containing, nickel-containing, and/or palladium-containing. More specific examples of metallic catalysts include copper acetylacetonate, palladium acetylacetonate, cobalt acetylacetonate, nickel acetylacetonate, and iron acetylacetonate. Metallic catalysts may increase a rate of polymerization compared to organic catalysts, which may help to make curing of the phthalonitrile-based resin faster. The mixing of the phthalonitrile-based resin and the catalyst can be performed via a centrifugal mixer, an overhead mixer, a powder agitator, mortar and pestle, hand-mixing, or a combination of two or more thereof. The catalyst can be mixed with the phthalonitrile-based resin and then stored for later use in preparing an ink (e.g. for B-staging and/or curing at a later time), or can be mixed at the time an ink is being prepared (e.g. immediately prior to B-staging and/or curing).

Method 100 further includes, at 104, optionally B-staging the phthalonitrile-based resin. B-staging may include, at 106, applying heat to initiate polymerization of the phthalonitrile-based resin, and at 108, quenching polymerization of the phthalonitrile-based resin before completion of polymerization to form a B-staged phthalonitrile-based resin. Heating during B-staging may be performed between temperatures of 150-250° C., or more preferably 190-210° C., and may be heated for between 10 minutes to 2 hours, more preferably 40 min to 70 min, depending upon the resin being used. Such temperature and time ranges may drive the polymerization to occur partially, but not fully. The B-staged resin can be pre-polymerized up to but not exceeding the gel point, such that the B-staged resin does not form a thermoset network, compared to a fully-polymerized phthalonitrile-based resin. As such, a B-staged phthalonitrile-based resin cures more quickly than an unpolymerized phthalonitrile-based resin (e.g. monomer or oligomer), yet can be dissolved in a solvent, due to lack of network formation, to form an ink and printed using suitable deposition techniques. It will be understood that in other examples, a phthalonitrile-based resin can be used without B-staging, with the result of relatively longer cure times than for the B-staged material. Using a phthalonitrile-based resin without B-staging can provide for a lower viscosity ink, and can reduce a number of processing steps and thus variability that can occur in B-staging.

Where the phthalonitrile material is B-staged, method 100 further includes, at 110, grinding the B-staged phthalonitrile-based resin to reduce a particle size of the B-staged phthalonitrile-based resin. Grinding can facilitate dissolving the B-staged phthalonitrile-based resin to form an ink. Grinding can be performed via any suitable grinding apparatus, such as a ball mill, other suitable milling apparatus, or a mortar and pestle, as examples. In some examples, the phthalonitrile-based resin may be ground to particle sizes of between 38-76 microns, or between 3-8 Hegman Units. Particle size analysis can be performed by laser diffraction methods, for example using ISO 13320:2020. As mentioned above, this method assumes a spherical particle, and is relevant for particles in size ranges from 0.1-3000 microns. For spherical and non-spherical particles, a size distribution can be reported, where the predicted scattering pattern for the volumetric sum of spherical particles matches the measured scattering pattern. Accordingly, an average particle size can be measured as the mean diameter of the particle found in the particle size distribution as measured by particle size analysis.

Continuing, method 100 can include, at 112, mixing the phthalonitrile-based resin, a conductive filler, and a solvent, to dissolve the phthalonitrile-based resin in the solvent and form an ink. In some examples, first the phthalonitrile-based resin (with optional catalyst) is mixed and dissolved in the solvent, before adding the conductive filler. The mixing and dissolving of the phthalonitrile-based resin in the solvent can be performed via any suitable mixing apparatus, including a shaker table, an overhead mixer, magnetic stirring, a centrifugal mixer, hand-mixing, or a combination of two or more thereof, as indicated at 114. The use of such a mixing apparatus may help to increase a rate of dissolution. The use of an overhead mixer may help to more completely and/or efficiently dissolve the phthalonitrile-based resin in less time. This may avoid an additional step of filtering the resulting ink where the dissolution is not as efficient, and also helps to produce a more homogeneous ink. In some examples, mixing and dissolving can be performed for a time of between 8 hours to 72 hours. In more specific examples, mixing and dissolving can be performed for a time of between 15 hours to 20 hours.

Conductive fillers and solvents can be selected depending on the applications for which the resistive ink is to be used. Other materials, such as the additional fillers and other components listed above, also can be used in various examples. Such fillers may be incorporated into the solvent/phthalonitrile-based resin mixture in any suitable manner, such as by mixing via a centrifugal mixer, an overhead mixer, and/or hand-mixing. Mixing can be performed for any suitable duration. In various examples, mixing can be performed for 5 min to 90 min, and in more specific examples, 50 min to 70 min. Such time ranges for mixing can help to sufficiently dissolve the conductive fillers in the solvent without being overly time-consuming and costly. Mixing and dissolving in some examples may include iteratively adding additional solvent and additional conductive filler in steps, as indicated at 116. In such examples, solvent and filler may be added in an alternating manner, or together at each addition step in various examples. Where the additional solvent is added separately from the additional filler, the additional solvent may be mixed for a duration of between 5-20 min in some examples, and between 5-10 min in more specific examples. Any suitable number of further additions of solvent and filler(s) may be performed. Such iterative mixing and dissolving steps may encourage more complete dissolution compared to a single-stage mixing process. In other examples, other mixing processes or a different order of mixing and adding steps may be utilized.

The phthalonitrile-based resin, and/or an ink comprising the phthalonitrile-based resin, can be stored for a period of time prior to use in an ink deposition process. Further, the phthalonitrile-based resin and/or ink comprising the phthalonitrile-based resin can be prepared by a first entity (e.g. a vendor), and provided to another (e.g. a customer) for use in an ink deposition process.

Continuing, method 100 comprises, at 118, depositing the resistive ink onto a substrate. Any suitable substrate can be used. Some examples include polymers such as KAPTON (a polyimide film, available from DuPont of Wilmington, Delaware, USA), aramid papers and substrates such as KOREX, KEVLAR, and NOMEX (each available from DuPont), polyimides, polyesters, TEFLON (polytetrafluoroethylene, available from Chemours of Wilmington, Delaware, USA), and silicones, as well as inorganic materials such as various metals/metallic materials, ceramics and glasses. Depositing a resistive ink onto the substrate can include screen printing, pad-printing, flexography, jet printing (e.g. piezo and thermal inkjet printing), lithography, intaglio printing, relief printmaking, serigraphy, monotyping and rotogravure, as examples. The applied precured resin on the substrate can have a thickness ranging from 0.01-200 mm. Film thickness can be determined, for example, using ASTM D8136-17 (Standard Test Method for Determining Plastic Film Thickness and Thickness Variability Using a Non-Contact Capacitance Thickness Gauge). Films in these thickness ranges may be effective conductors. The viscosity of the ink can be adjusted depending on the printing/deposition process to be used, e.g. by adding suitable solvents, fillers, and/or other additives. After deposition, the resistive ink can further be cured via a curing process. Any suitable curing process can be used, including radiation-based curing (e.g. ultraviolet light, electron beam, etc.) and thermal curing. In some examples, a thermal curing process can be used in which the ink is exposed to a temperature approximating that to which the deposited ink film will be exposed during use. In some examples, curing can be performed at a temperature in a range of 200° C. to 425° C.

Figure 2:
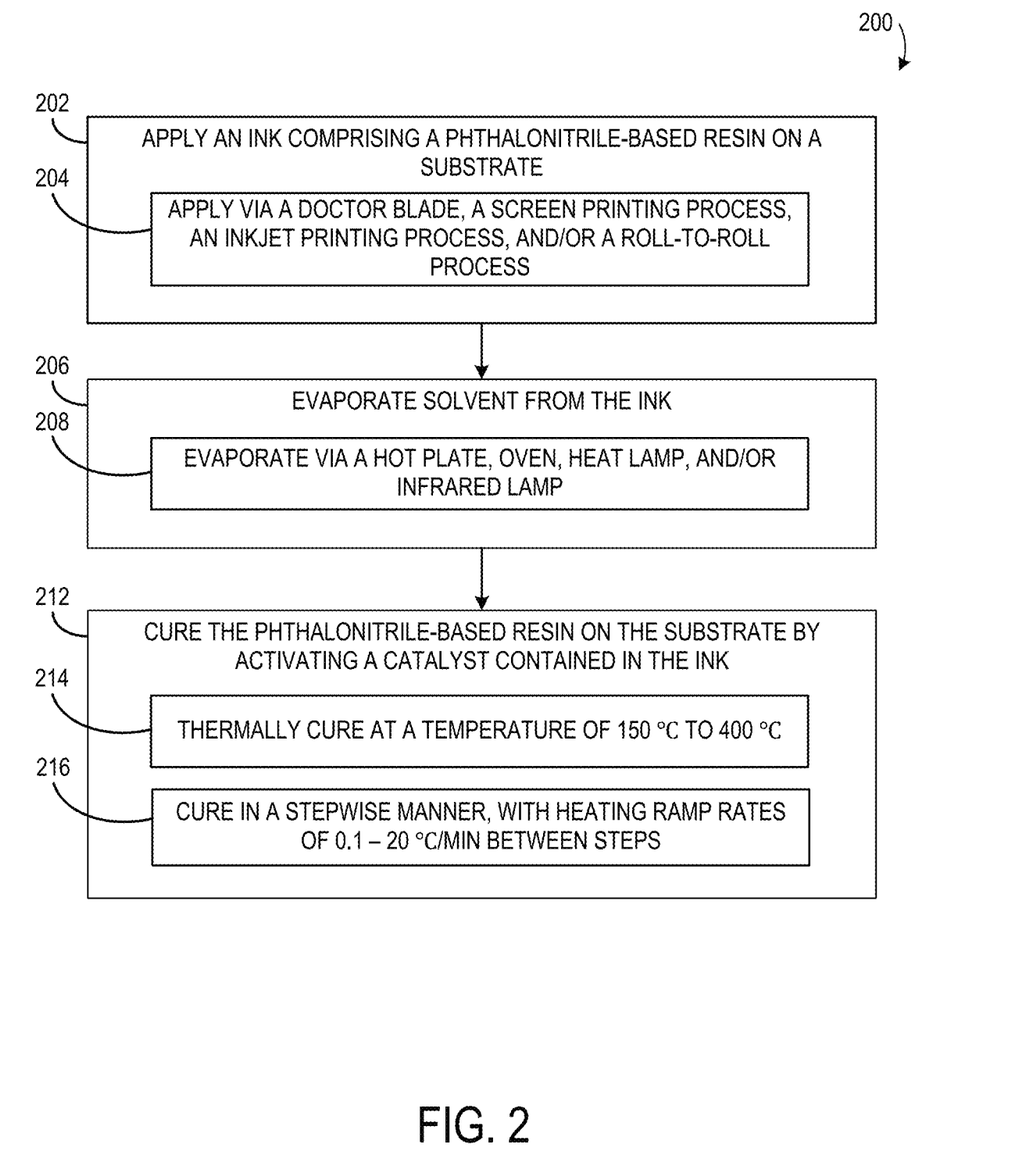
FIG. 2 shows a flow diagram depicting an example method of making a resistive film.

FIG. 2 shows a method 200 of making a resistive film. Method 200 includes, at 202, applying an ink comprising a phthalonitrile-based resin on a substrate. This application may be performed in any suitable manner. As examples, the ink may be applied via a doctor blade, a screen printing process, an inkjet printing process, and/or a roll-to-roll process, at 204. Next, method 200 includes, at 206, evaporating solvent from the ink. This may include heating and evaporating via a hot plate, an oven, a heat lamp, and/or an infrared lamp, as indicated at 208, or the ink may be allowed to air dry. Where heating is used, heat may be applied for 1 to 3 minutes to evaporate the solvent in some examples. Such heating methods to evaporate the solvent may help to promote polymerization. Method 200 further includes, at 212, curing the phthalonitrile-based resin on the substrate by activating a catalyst contained in the ink. Examples of suitable catalysts include those listed above. Any suitable curing process may be used. For example, an ink may include a thermal initiator, and curing may include thermally curing at a temperature of 150-400° C., at 214. Such temperatures may also help to promote polymerization. In some examples, thermal curing may be performed in a stepwise manner, with heating ramp rates of 0.1-20° C./min between steps, at 216. Heating in ramping steps may help to achieve a desired percolation of the filler materials through the slow buildup of viscosity, and also may improve overall reaction completion/network formation by providing for mobility of reactive groups. The resulting resistive film on the substrate may have a thickness ranging from 0.01-150 mm (not including the substrate). Thinner films may dry more quickly, while thicker films may provide more conductivity.

Experimental Results

Results of sheet resistance measurements, isothermal gravimetric analysis, shear viscosity measurements, and lap-shear testing on example phthalonitrile-based resistive inks are described below. Bisphenol A oligomeric phthalonitrile composition (bis A PN) and resorcinol oligomeric PN compositions were obtained from Chromak Research, Inc., and used as received. Uncatalyzed versions of the bis A PN and resorcinol oligomeric PN were obtained from the U.S. Naval Research Laboratory (of Washington, DC, USA). Bis[4-(3-aminophenoxy) phenyl] sulfone (m-BAPS) was obtained from Tokyo Chemical Industry (TCI) America (of Portland, Oregon, USA). Graphite (PN #282863) and 2-phenoxyethanol were obtained from Sigma Aldrich and used as received. SUPER P carbon black was obtained from Alfa Aesar and used as received. Fumed silica AEROSIL R 812 was obtained from Evonik Resource Efficiency GmbH (of Darmstadt, Germany) and used as received. LOCTITE EDAG PR 018 and LOCTITE EDAG 33RO65A (available from Henkel Corporation of Rocky Hill, Connecticut, USA) were used as control inks.

The following Comparative Examples were used as controls in the disclosed experiments.

Comparative Example C-1

An aliquot of LOCTITE EDAG PR 018 was transferred to a mixing container and mixed at 2300 rotations per minute (rpm) for 1 minute. A film having a 1 millimeter (mm) thickness target was cast on KAPTON film from the resulting homogenous ink mixture and cured at 204-218° C. for 2.5 hours.

Comparative Example C-2

An aliquot of LOCTITE EDAG 33RO65A was transferred to a mixing container and mixed at 2300 rpm for 1 minute. A 1 mil thick film was cast on KAPTON film from the resulting homogenous ink mixture and cured at 204-218° C. for 2.5 hours.

Example 1: B-Staging Bisphenol a Oligomeric Phthalonitrile

Fifty grams (g) of the as-received bisphenol A oligomeric phthalonitrile composition was placed into a foil lined crystallizing dish (6" diameter) and heated (B-staged) at 200° C. for 90 min in a furnace. The dish was then removed and the material quench cooled under ambient conditions to form a B-staged material. A mortar and pestle were used to grind the B-staged bis A PN to fine powder to be used for subsequent ink preparation.

Example 1.1

One g of B-staged bis A PN and 7 g 2-phenoxyethanol were mixed for several days using a laboratory orbital shaker, and the resulting solution filtered through a 200 micron filter to eliminate any undissolved grains. Next, 1.75 g graphite was added and mixed with a mixer at 2300 rpm for 1 minute. Then, 0.25 g SUPER P carbon black was added and mixed with a mixer at 2300 rpm for several minutes until a smooth mixture was obtained.

Example 1.2

Two g of B-staged bis A PN and 4 g 2-phenoxyethanol were mixed for several days using an orbital shaker, and the resulting solution filtered through a 200 micron filter to eliminate any undissolved grains. Next, 3 g graphite was added and mixed with a mixer at 2300 rpm for few minutes until a smooth mixture was obtained.

Example 1.3

Two g of B-staged bis A PN and 4 g 2-phenoxyethanol were mixed for several days using an orbital shaker, and the resulting solution filtered through a 200 micron filter to eliminate any undissolved grains. Next, 1.6 g graphite was added and mixed with a mixer at 2300 rpm for 1 minute. Then, 0.3 g SUPER P carbon black was added and mixed with a mixer at 2300 rpm for several minutes until a smooth mixture was obtained.

Example 1.4

Two g of B-staged bis A PN and 4 g 2-phenoxyethanol were mixed for several days using an orbital shaker and the resulting solution filtered through a 200 micron filter to eliminate any undissolved grains. Next, 1.7 g graphite was added and mixed with a mixer at 2300 rpm for 1 minute. Then, 0.3 g AEROSIL® R 812 was added and mixed with a mixer at 2300 rpm for several minutes until a smooth mixture was obtained.

Example 1.5

50 g of B-staged bis A PN and 142.3 g of 2-phenoxyethanol were mixed with an overhead mixer for 17 hours at 400 rpm. The resulting solution contained no undissolved grains. Then, 10.078 g of Super P carbon black was added over 15 minutes mixing at 400 rpm, 20.16 g of graphite was added over 10 minutes mixing at 500 rpm, 4.74 g of 2-phenoxyethanol was added dropwise over 5 minutes mixing at 515-525 rpm, 20.16 g of graphite was added over 10 minutes mixing at 525-550 rpm, and 4.74 g of 2-phenoxyethanol was added dropwise over 5 minutes mixing at 550-600 rpm. The resulting mixture was stirred for 15 more minutes at 625 rpm.

Example 1.6

Two g of B-staged bis A PN and 5.7 g of 2-phenoxyethanol were mixed for between 1-3 days using a laboratory orbital shaker. The resulting solution was filtered through a 200 micron filter to eliminate any undissolved grains. Then, 0.41 g of Super P carbon black was added and mixed with a FlackTek mixer (available from FlackTek, Inc. of Landrum, SC) for 30 seconds at 800 rpm, 30 seconds at 1200 rpm, and 2 minutes at 2000 rpm. 1.64 g of graphite was added and mixed with a FlackTek mixer for 30 seconds at 800 rpm, 30 seconds at 1200 rpm, and 2 minutes at 2000 rpm.

Example 1.7

Two g of B-staged bis A PN and 5.7 g of 2-phenoxyethanol were mixed with an overhead mixer for 17 hours at 400 rpm. The resulting solution contained no undissolved grains. Then, 0.41 g of Super P carbon black was added and mixed with a FlackTek mixer for 30 seconds at 800 rpm, 30 seconds at 1200 rpm, and 2 minutes at 2000 rpm. 1.64 g of graphite was added and mixed with a FlackTek mixer for 30 seconds at 800 rpm, 30 seconds at 1200 rpm, and 2 minutes at 2000 rpm.

Example 2: B-Staging Resorcinol Oligomeric Phthalonitrile

Seven g of the as-received resorcinol oligomeric PN composition was placed into a foil lined crystallizing dish (4" diameter) and heated (B-staged) at 190° C. for 20 min in a furnace. The dish was then removed and the material quench cooled under ambient conditions (room temperature and atmosphere). A mortar and pestle were used to grind the B-staged resorcinol PN to a powder to be used for subsequent ink preparation.

Example 2.1

One g B-staged resorcinol PN and 7 g 2-phenoxyethanol were mixed for several days using an orbital shaker, and the resulting solution filtered through a 200 micron filter to eliminate any undissolved grains. Next, 2 g graphite was added and mixed with a mixer at 2300 rpm for 1 minute. Then, 0.2 g SUPER P carbon black was added and mixed with a mixer at 2300 rpm for several minutes until a smooth mixture was obtained.

Example 3: B-Staging of Uncatalyzed Bis A Pn

One hundred eighty g of the uncatalyzed bis A PN was added to a mixing cup with 5.4 g of m-BAPS (catalyst), and the materials were mixed in a FlackTek mixer for 1 minute at 800 rpm. The resulting composition was placed into a foil-lined crystallizing dish (6 inch diameter) and heated at 200° C. for 45 minutes in a furnace to B-stage the bis A PN. The dish was then removed and the material quench-cooled under ambient conditions. A mortar and pestle were used to grind the B-staged bis A PN to a fine powder for subsequent ink preparation.

Example 3.1: Preparation of Ink Base-PN Blend 25.0 g of 2-phenoxyethanol, 4.99 g of uncatalyzed, b-staged bis A PN, 1.66 g of uncatalyzed resorcinol oligomeric PN, and 0.05 g of m-BAPS were added to a mixing cup. Magnetic stirring was applied at 600 rpm and the solution was allowed to mix overnight. The resulting PN Blend Ink Base was homogenous and contained no undissolved grains.

Example 3.2: Preparation of Ink-PN Blend 15.8 g of PN Blend Ink Base (Example 3.1) was added to a mixing cup along with 0.84 of Super P carbon black. This sample was mixed using a FlackTek mixer for 30 seconds at 800 rpm, 30 seconds at 1200 rpm, and 2 minutes at 2000 rpm. 3.36 g of graphite was added and the sample was mixed using a FlackTek mixer for 30 seconds at 800 rpm, 30 seconds at 1200 rpm, and 6 minutes at 2000 rpm. The resulting solution was a smooth ink.

Example 4: Quick Setting of Ink

The ink was cast on KAPTON film with a doctor blade and the film was laid flat on a hot plate at 200° C. for quick setting. After 2 minutes, all solvent was evaporated and the film was removed from the hot plate. The quick setting procedure allowed the solvent to be quickly evaporated, resulting in a dry ink surface ready for further processing or storing.

Example 5: Curing of Ink

Unless otherwise noted, curing of the ink was performed in a furnace under air. The temperature profile consisted of 1 hour at 200° C., 1 hour at 250° C., and 24 hours at 300° C. A ramp rate of 1.8° C. per minute was used between all temperatures.

The following characterization experiments were conducted on the above examples: sheet resistance measurement, thermal oxidative stability, shear viscosity, and lap-shear loads.

TABLE 1

Experimental results of sheet resistance for example resistive inks.

| | Binder: Filler (by wt.) | Sheet Resistance (Ω per square) |
|---|---|---|
| Example 1.2 | 1:1.5 | 46 |
| Example 1.3 | 1:1 | 23 |
| Example 1.4 | 1:1 | 122 |
| Comparative Example C-1 | N/A | 406 |
| Comparative Example C-2 | N/A | 20 |

Figure 3:
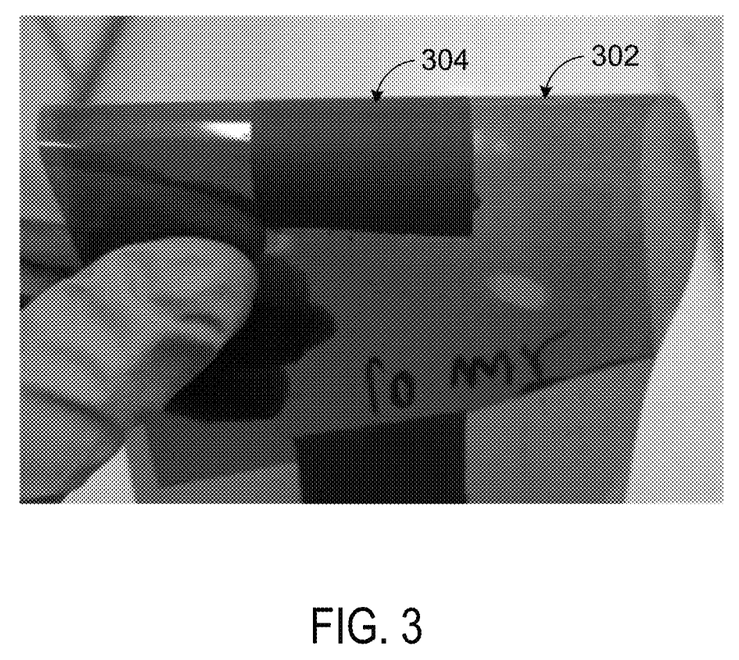
FIG. 3 shows a photograph of an example resistive ink cured on a substrate for use in sheet resistance measurement.

Table 1 shows experimental results of measured sheet resistance for example resistive inks compared to control inks. Resulting inks from Examples 1.2, 1.3, and 1.4 were cast on a KAPTON substrate and cured in oven under inert condition using the following cure schedule: 200° C. (90 minutes), 250° C. (6 hours), 300° C. (3 hours), 350° C. (3 hours), 375° C. (6 hours) prior to the sheet resistance measurement. All of the examples were cured under nitrogen. Sheet resistance measurements were performed on 1"×1" samples of ink that were cast to have a 1 mm target thickness and cured on the KAPTON substrate. Sheet resistance of applied ink on the substrate was measured using a calibrated 4-point probe (Loresta, available from OAI Instruments of Milpitas, CA), and reported as ohms/square at a 1 mil target thickness. The four-point probe was aligned so all contacts rested on the ink itself. Hand pressure was applied on the probe during the measurement to ensure contact with the sample. FIG. 3 shows a photograph of a flexible cured thin film substrate 302 having an example resistive ink 304 as configured for sheet resistance measurements. As shown in the table of FIG. 2, sheet resistance in ohms per square for each of Examples 1.2, 1.3, and 1.4 were lower than that of Comparative Example C-1, but greater than that of Comparative Example C-2. These results show that the phthalonitrile resin-based compositions can achieve similar resistances to the control inks.

TABLE 2

Experimental results of sheet resistance for other example resistive inks

| | Sheet Resistance (Ω per square) |
|---|---|
| Example 1.5 | 119 |
| Example 1.6 | 115 |
| Comparative Example C-1 | 169 |
| Comparative Example C-2 | 36 |

Table 2 shows another set of experimental results of measured sheet resistance for example resistive inks compared to control inks. Resulting inks from Examples 1.5 and 1.6 were cast on a KAPTON substrate and cured in oven in air using the following cure schedule: 200° C. (1 hour), 250° C. (1 hour), 300° C. (24 hours), with a ramp rate of 1.8° C. per minute prior to the sheet resistance measurement. As shown in the table of FIG. 2, sheet resistance in ohms per square for Examples 1.5 and 1.6 were lower than that of Comparative Example C-1, but greater than that of Comparative Example C-2. These results show that the phthalonitrile resin-based compositions can achieve similar resistances to the control inks.

Figure 4:
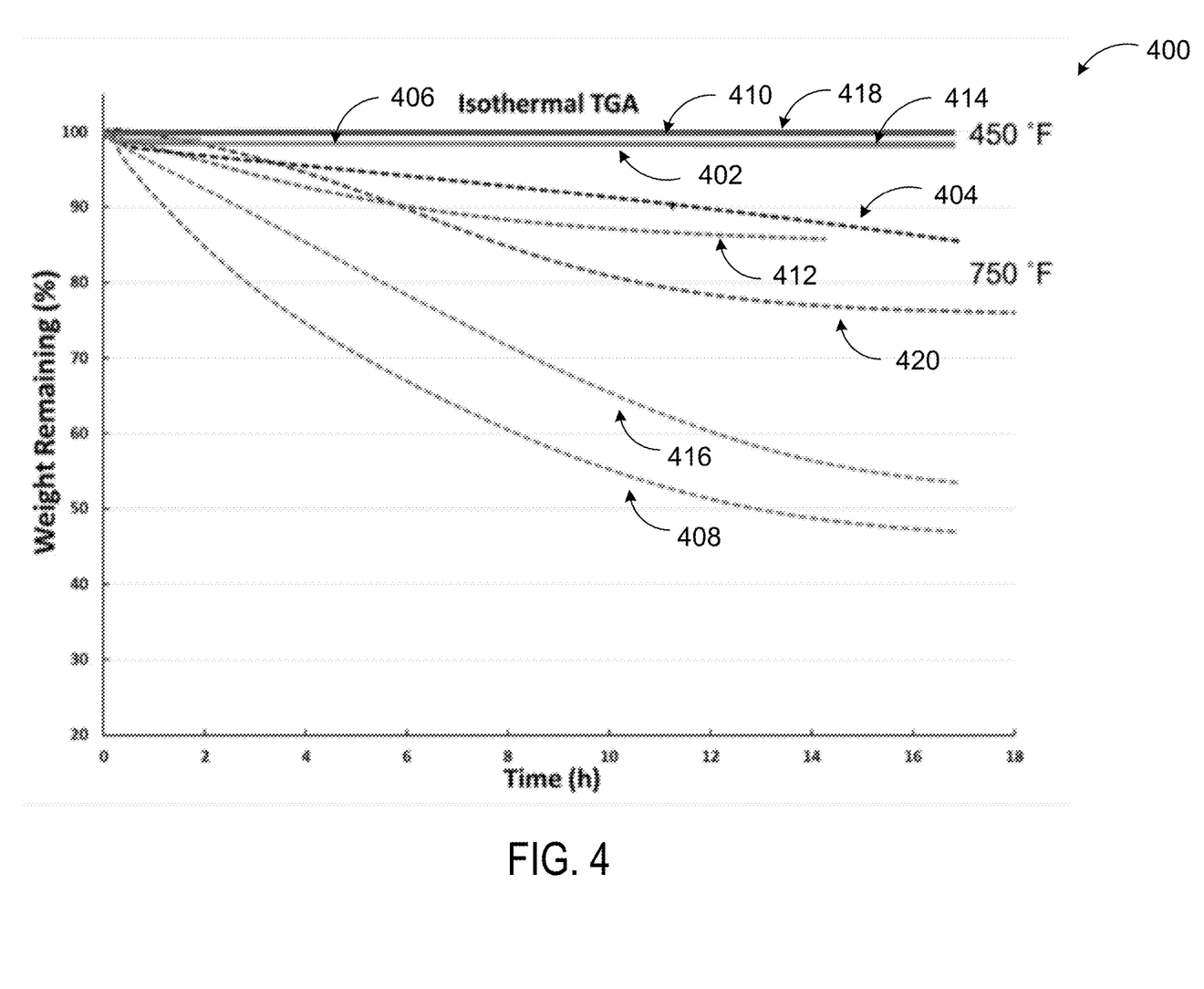
FIG. 4 shows a graph depicting results of isothermal gravimetric analysis for example resistive inks compared to control inks.

FIG. 4 shows a graph 400 depicting results of thermogravimetric analysis (TGA) performed at 232° C. (solid lines) and 399° C. (dashed lines) for Comparative Example C-1 (402, 404), Comparative Example C-2 (406, 408), Example 1.1 (410, 412), Example 1.3 (414, 416) and Example 2.1 (418, 420). Resulting inks from Examples 1.1, 1.3 and 2.1 were cured in an oven under inert conditions for the following sequence of temperatures (times): 200° C. (90 minutes), 250° C. (6 hours), 300° C. (3 hours), 350° C. (3 hours), and 375° C. (6 hours). The binder to filler ratio for Example 1.1 was 1:2, for Example 1.3 was 1:1, and for Example 2.1 was 1:2.2. Thermal stability is measured here by weight remaining and TD 5% (time for 5% of the ink weight to be lost). TGA testing was performed on 15-20 mg of the cured ink formulation (no substrate) in air. The temperature was taken from 25° C. up to either 232° C. or 399° C. at a ramp rate of 25° C./min. The temperature was held for at least 14 hours upon which the remaining weight percent at 14 hours was recorded as well as the time in which the first 5% of the sample's total weight was lost ($T_{d5\%}$). Table 3 shows experimental results of measured weight remaining for the example resistive inks shown in the graph FIG. 4. At 232° C., no formulations tested at this temperature reached 5% weight loss within 18 hours. At 399° C., the weight lost for examples 1.1, 1.3, and 2.1 was between that of Comparative Examples C-1 and C-2. These results show that the experimental inks have comparable stability to the control inks.

TABLE 3

Experimental results of measured weight for example resistive inks

| | Temperature (° C.) | Td 5% (hr) | Weight Remaining (14 hours) (%) |
|---|---|---|---|
| Example 1.1 | 232 | — | 100 |
| | 399 | 2.6 | 86 |
| Example 1.3 | 232 | — | 99 |
| | 399 | 1.3 | 57 |
| Example 2.1 | 232 | — | — |
| | 399 | 3 | 74 |
| Comparative Example C-1 | 232 | — | 99 |
| | 399 | 4.8 | 88 |
| Comparative Example C-2 | 232 | — | 98 |
| | 399 | 0.6 | 49 |

Figure 5:
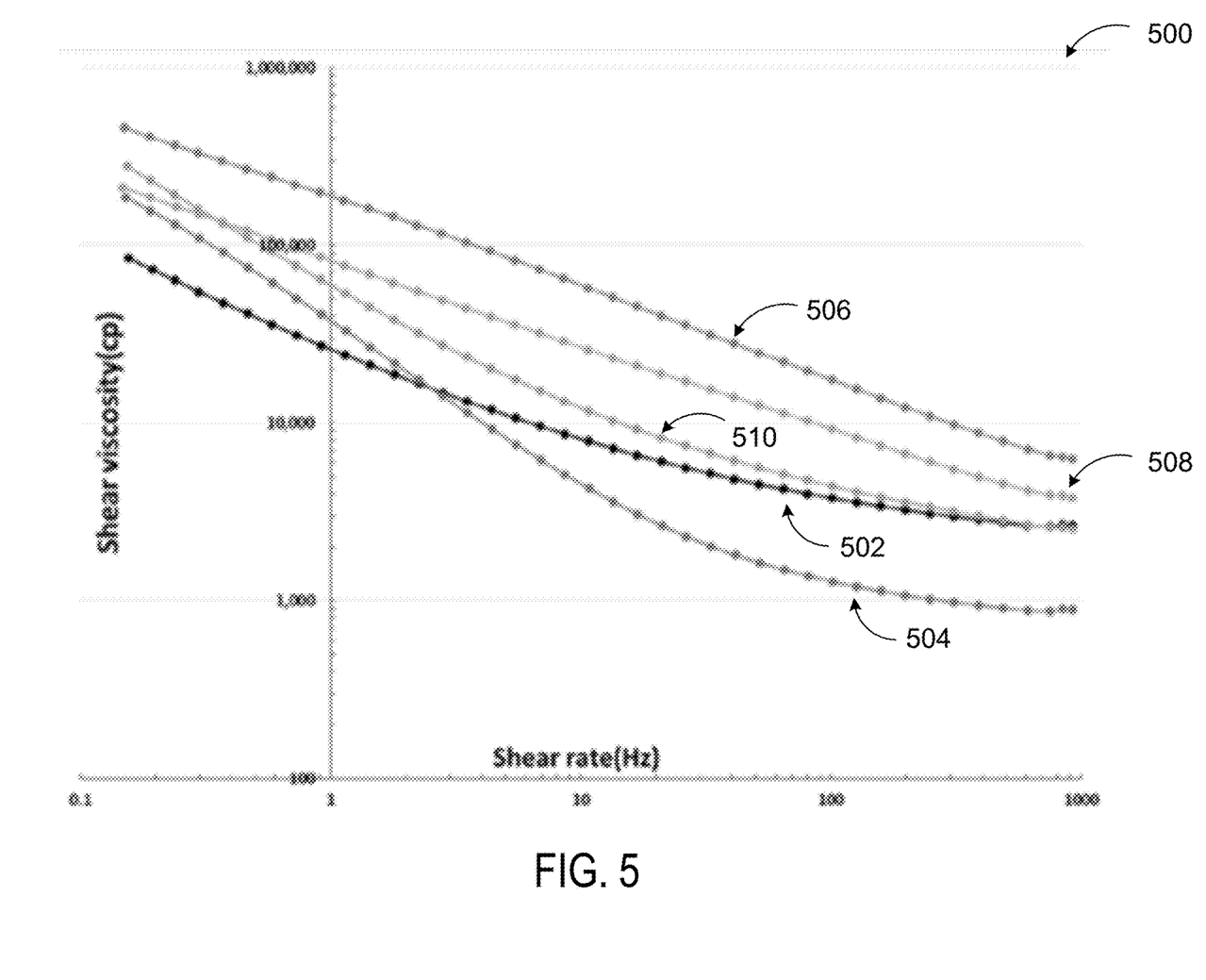
FIG. 5 shows a graph depicting measured shear viscosities for example resistive inks compared to control inks.

Shear viscosity tests were performed under air on a Kinexus rheometer (from NETZSCH Instruments North America, LLC of Boston, MA) with 25 mm PL56 and PU25 disposable plates at a 1 mm working gap. The shear viscosity was recorded at 40 time points as the shear rate increased from 0.1 to 1000 Hz in 4 minutes. FIG. 5 shows a graph 500 of measured shear viscosity for Comparative Example C-1 (502), Comparative Example C-2 (504), and Examples 1.2 (506), 1.3 (508), and 1.4 (510) over a shear rate range of 0.1-1000 Hertz (Hz), measured at room temperature using a parallel plate setup on a rheometer (Brookfield DVT3 Cone and Plate, available from Brookfield/Ametek of Middleboro, MA). At a shear rate of 10 Hz, a shear viscosity of 58 k centipoise (cP), 26 k cP, 12 k cP for Examples 1.2, 1.3, and 1.4 were measured, respectively. Table 4 shows shear viscosity for these examples at around 900-1000 Hz. As mentioned above, the viscosity of an ink can affect how the ink is printed and deposited onto a substrate. These experimental results show similar viscosity ranges in the experimental inks and the control inks, indicating that printing processes used for the control inks also can be used to deposit the experimental inks.

TABLE 4

Experimental results of shear viscosity for example resistive inks

| Shear Rate ~900-1000 Hz | Shear Viscosity (cP) |
|---|---|
| Example 1.2 | 6286 |
| Example 1.3 | 3814 |
| Example 1.4 | 2552 |
| Comparative Example C-1 | 2642 |
| Comparative Example C-2 | 890 |

Figure 6:
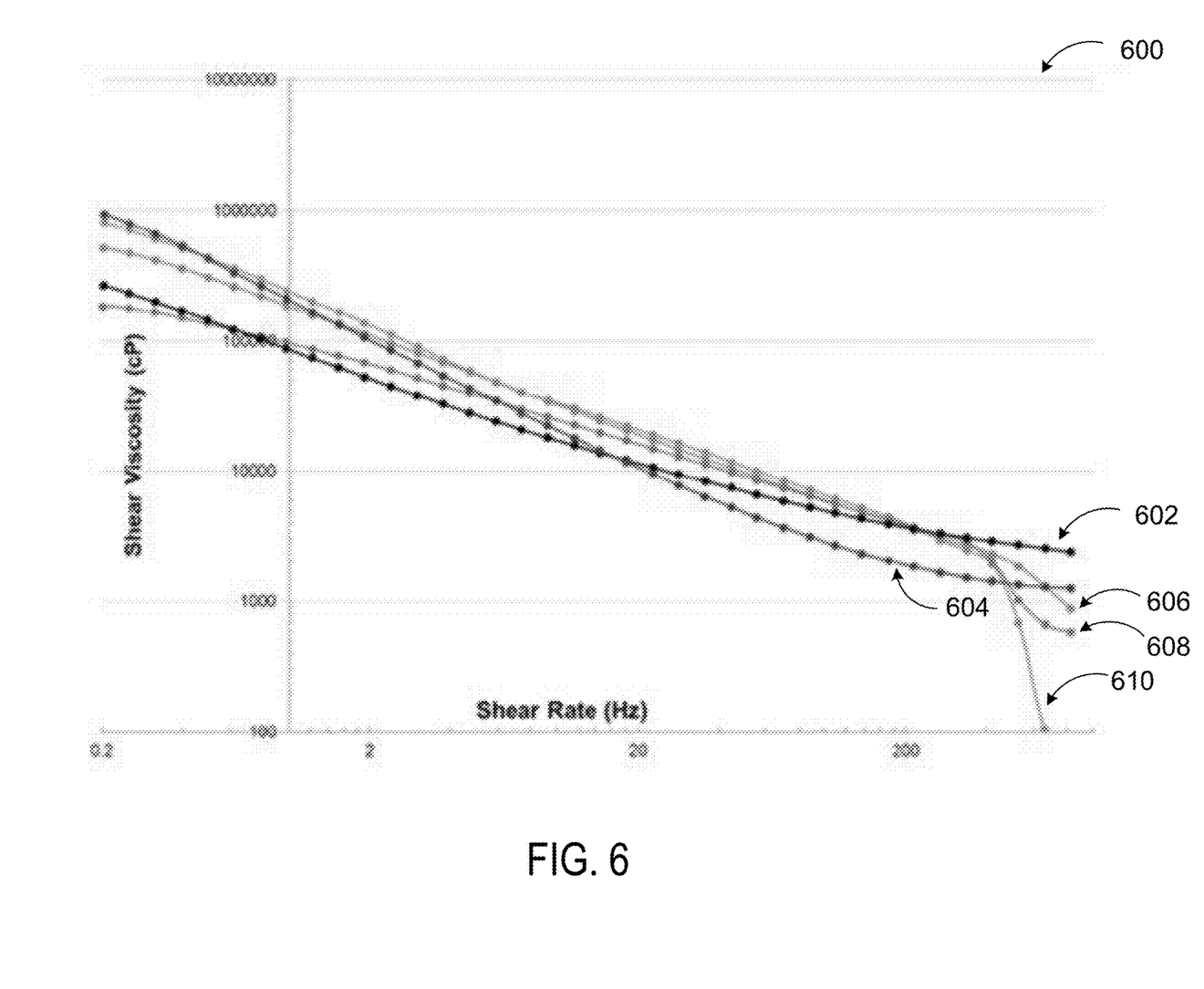
FIG. 6 shows another graph depicting measured shear viscosities for example resistive inks compared to control inks.

FIG. 6 shows a graph 600 of measured shear viscosity for Comparative Example C-1 (602), Comparative Example C-2 (604), Example 1.5 (606), Example 1.6 (608), and Example 1.7 (610) over a shear rate range of 0.1-1000 Hz. At a shear rate of 10 Hz, a shear viscosity of ~29 k cP, 26 k cP, and 30 k cP for Examples 1.5, 1.6 and 1.7 were measured, respectively. Table 5 shows shear viscosity for these examples at around 900-1000 Hz. As mentioned above, the viscosity of an ink can affect how the ink is printed and deposited onto a substrate. These experimental results show slightly different ranges for shear viscosity compared to Examples 1.2, 1.3 and 1.4 shown above.

TABLE 5

Experimental results of shear viscosity for other example resistive inks

| Shear Rate ~800-900 Hz | Shear Viscosity (cP) |
|---|---|
| Example 1.5 | 882 |
| Example 1.6 | 588 |
| Example 1.7 | 106 |
| Comparative Example C-1 | 2424 |
| Comparative Example C-2 | 1269 |

For lap-shear testing, which determines the cohesive strength of the ink, ASTM D1002 (Standard Test Method for Apparent Shear Strength of Single-Lap-Joint Adhesively Bonded Metal Specimens by Tension Loading (Metal-to-Metal)) was used. Lap-shear panels (single-lap-joint) were prepared with Examples 1.3, 1.5, 1.7, 3.2 and two control inks. Samples were made with solvent-wiped aluminum coupons (1"×4"×0.063") utilizing a 1"×1" adhesive contact area. A thin layer of ink was spread on both sides of the corresponding coupon set and glass microspheres were added in the center of one coupon to control the bondline thickness (6-15 mil) by maintaining a separation between the coupon set during curing. The corresponding panels were then aligned by hand and firmly pressed together to create a single-lap-joint panel. Each panel was appropriately balanced (including top weight). The comparative samples were cured at 204-218° C. for 2.5 hours, while Example 1.3 was cured as follows: 200° C. (90 minutes), 250° C. (6 hours), 300° C. (3 hours), 350° C. (3 hours), 375° C. (6 hours). All other samples were cured according to the cure profile described in Example 5. Lap-shear testing was performed at room temperature with an INSTRON 5969 mechanical tester (available from Instron, Inc. of Norwood, MA) using a crosshead speed of 0.05 in/min to attempt to shear the single lap joints apart. Four coupons of each ink were tested and the results for average max load for lap-shear testing are shown in Table 6. As shown, Example 1.3 was able to withstand a higher average max load compared to the control inks during shear testing, indicating that the cohesive strength of the ink of Example 1.3 is higher than that of the control inks.

TABLE 6

Experimental results of average max load in lap-shear testing for example resistive inks

| E-Ink | Avg Max Load (psi) (n = 4) |
|---|---|
| Example 1.3 | 135 |
| Comparative Example C-1 | 1 |
| Comparative Example C-2 | 3 |

Further, the disclosure comprises configurations according to the following clauses. The terms "comprising", "comprise" and "comprises" herein are intended to be optionally substitutable with the terms "consisting essentially of", "consist essentially of", "consists essentially of", "consisting of", "consist of" and "consists of", respectively, in every instance.

Clause 1. A resistive ink, comprising: a solvent; a thermally-curable, phthalonitrile-based resin dissolved in the solvent; and one or more conductive fillers.

Clause 2. The resistive ink of Clause 1, wherein the phthalonitrile-based resin comprises a ketone, an ether, a urethane, a urea, an amide, an imide, an ester, a sulfone, an oxamide, a benzoxazine, a maleimide, or a combination of two or more thereof.

Clause 3. The resistive ink of Clause 1 or 2, wherein the phthalonitrile-based resin comprises a PEEK-based phthalonitrile-based resin.

Clause 4. The resistive ink of any of Clauses 1 to 3, wherein the solvent comprises 2-phenoxyethanol, NMP, m-cresol, benzyl alcohol, diphenyl ether, acetone, MEK, MPK, MIBK, THF, n-butyl acetate, chloroform, methylene chloride, carbon tetrachloride, toluene, trichloroethylene, isopropanol, diethyl ether, dimethyl sulfoxide, dimethyl formamide, xylene or a combination of two or more thereof.

Clause 5. The resistive ink of any of Clauses 1 to 4, wherein the conductive filler comprises activated carbon, graphite, short-chopped carbon fiber, nickel, silver, copper, gold, platinum, iridium, stainless steel, iron, titanium, zinc, or a combination of two or more thereof.

Clause 6. The resistive ink of any of Clauses 1 to 5, wherein the conductive filler comprises particles having an aspect ratio of less than 2.

Clause 7. The resistive ink of any of Clauses 1 to 6, further comprising a dispersant, a flow agent, a cure promoter, a surfactant, a flame retardant, a viscosity modifier, or a combination of two or more thereof.

Clause 8. The resistive ink of any of Clauses 1 to 7, further comprising a metallic catalyst, an amino-functional catalyst, a phenolic-functional catalyst, or a combination of two or more thereof.

Clause 9. The resistive ink of any of Clauses 1 to 8, wherein the metallic catalyst is copper-containing, iron-containing, zinc-containing, nickel-containing, palladium-containing, iron-containing, cobalt-containing, or a combination of two or more thereof.

Clause 10. The resistive ink of any of Clauses 1 to 9, further comprising an organic filler comprising PEEK, PEKK, a polyetherimide, or a combination of two or more thereof.

Clause 11. An article comprising: a substrate; and a resistive film on the substrate, the resistive film comprising a phthalonitrile-based polymer and a conductive filler dispersed in the phthalonitrile-based polymer.

Clause 12. The article of Clause 11, wherein the resistive film comprises a thickness ranging from 0.01 mm-150 mm.

Clause 13. The article of Clause 11 or 12, wherein the phthalonitrile-based polymer comprises a PEEK-based phthalonitrile-based polymer.

Clause 14. The article of any of Clauses 11 to 13, wherein the phthalonitrile-based polymer comprises a ketone, an ether, a urethane, a urea, an amide, an imide, an ester, a sulfone, an oxamide, a benzoxazine, a maleimide, or a combination of two or more thereof.

Clause 15. The article of any of Clauses 11 to 14, wherein the conductive filler comprises activated carbon, graphite, a short-chopped carbon fiber, a metallic filler, or a combination of two or more thereof.

Clause 16. The article of any of Clauses 11 to 15, wherein the conductive filler comprises particles having an aspect ratio of less than 2.

Clause 17. The article of any of Clauses 11 to 16, further comprising an organic filler comprising PEEK, PEKK, a polyetherimide, or a combination of two or more thereof.

Clause 18. The article of any of Clauses 11 to 17, further comprising an inorganic filler comprising silica, fumed silica, alumina, or a combination of two or more thereof.

Clause 19. A method of making a resistive ink, the method comprising: mixing a phthalonitrile-based resin, a conductive filler, and a solvent to dissolve the phthalonitrile-based resin in the solvent and to form the resistive ink.

Clause 20. The method of Clause 19, further comprising, prior to mixing the phthalonitrile-based resin, applying heat to initiate a polymerization of a phthalonitrile-based resin, and quenching polymerization of the phthalonitrile-based resin before completion of polymerization to form a B-staged phthalonitrile-based resin.

Clause 21. The method of Clause 19 or 20, wherein applying heat to initiate polymerization of the phthalonitrile-based resin comprises heating to a temperature between 150-250° C. for a time within a range between 10 minutes to 2 hours.

Clause 22. The method of any of Clauses 19 to 21, wherein applying heat to initiate polymerization of the phthalonitrile-based resin comprises heating to a temperature of 200° C. or greater to quick set the phthalonitrile-based resin.

Clause 23. The method of any of Clauses 19 to 22, further comprising grinding the phthalonitrile-based resin prior to mixing.

Clause 24. The method of any of Clauses 19 to 23, further comprising mixing a catalyst with the phthalonitrile-based resin prior to polymerization.

Clause 25. The method of any of Clauses 19 to 24, wherein mixing the phthalonitrile-based resin and the solvent comprises mixing via one or more of a shaker table, an overhead mixer, magnetic stirring, and a centrifugal mixer.

Clause 26. The method of any of Clauses 19 to 25, wherein mixing the conductive filler in the solvent comprises mixing for between 5 minutes to 90 minutes.

Clause 27. The method of any of Clauses 19 to 26, further comprising adding additional solvent after mixing the conductive filler, adding additional conductive filler, and then adding additional solvent.

Clause 28. The method of any of Clauses 19 to 27, wherein the phthalonitrile-based resin comprises a PEEK-based phthalonitrile resin.

Clause 29. The method of any of Clauses 19 to 28, further comprising depositing the ink on a substrate comprising a polyimide, a polyethylene terephthalate, a polyimide, a polyester, polytetrafluoroethylene, or a silicone substrate.

Clause 30. A method of making a high temperature resistive film and/or cured adhesive, the method comprising: applying an ink comprising a phthalonitrile-based resin on a substrate; evaporating solvent from the ink; and curing the phthalonitrile-based resin on the substrate by activating a catalyst contained in the ink.

Clause 31. The method of Clause 30, wherein the applying the ink comprises applying via a doctor blade, a screen-printing process, a roll-to-roll process, or a combination thereof.

Clause 32. The method of Clause 30 or 31, wherein the ink applied on the substrate comprises a thickness ranging from 0.01-150 millimeters.

Clause 33. The method of any of Clauses 30 to 32, wherein evaporating the solvent comprises evaporating the solvent via a hot plate, oven, a heat lamp, an infrared lamp, or a combination of two or more thereof and heating for 1 min to 3 min.

Clause 34. The method of any of Clauses 30 to 33, wherein curing the phthalonitrile-based resin comprises thermally curing the phthalonitrile-based resin at a temperature within a range of 150° C. to 400° C.

Clause 35. The method of any of Clauses 30 to 34, wherein curing the phthalonitrile-based resin comprises curing for 20-40 hours.

Clause 36. The method of any of Clauses 30 to 35, wherein curing the phthalonitrile-based resin comprises curing in a stepwise manner comprising two or more steps, with heating ramp rates ranging from 0.1-20° C./min between steps.

The invention claimed is:

1. A resistive ink, comprising:
   a solvent;
   a curable phthalonitrile resin dissolved in the solvent; and
   one or more conductive fillers.

2. The resistive ink of claim 1, wherein the phthalonitrile resin comprises a ketone, an ether, a urethane, a urea, an amide, an imide, an ester, a sulfone, an oxamide, a benzoxazine, a maleimide, or a combination of two or more thereof.

3. The resistive ink of claim 1, wherein the phthalonitrile resin comprises a polyether ether ketone (PEEK) resin.

4. The resistive ink of claim 1, wherein the solvent comprises 2-phenoxyethanol, N-methyl-2-pyrrolidone (NMP), m-cresol, benzyl alcohol, diphenyl ether, acetone, methyl ethyl ketone (MEK), methyl n-propyl ketone (MPK), methyl isobutyl ketone (MIBK), tetrahydrofuran (THF), n-butyl acetate, chloroform, methylene chloride, carbon tetrachloride, toluene, trichloroethylene, isopropanol, diethyl ether, dimethyl sulfoxide, dimethyl formamide, xylene or a combination of two or more thereof.

5. The resistive ink of claim 1, wherein the conductive filler comprises activated carbon, graphite, short-chopped carbon fiber, nickel, silver, copper, gold, platinum, iridium, stainless steel, iron, titanium, zinc, or a combination of two or more thereof.

6. The resistive ink of claim 1, further comprising a dispersant, a flow agent, a cure promoter, a surfactant, a flame retardant, a viscosity modifier, or a combination of two or more thereof.

7. The resistive ink of claim 1, further comprising a metallic catalyst, an amino-functional catalyst, a phenolic-functional catalyst, or a combination of two or more thereof.

8. The resistive ink of claim 1, further comprising an organic filler comprising polyether ether ketone (PEEK), polyether ketone ketone (PEKK), a polyetherimide, or a combination of two or more thereof.

9. A method of making a resistive ink, the method comprising:

mixing a phthalonitrile resin, a conductive filler, and a solvent to dissolve the phthalonitrile resin in the solvent and to form the resistive ink.

10. The method of claim 9, further comprising, prior to mixing the phthalonitrile resin, applying heat to initiate a polymerization of the phthalonitrile resin, and quenching polymerization of the phthalonitrile resin before completion of polymerization to form a B-staged phthalonitrile resin.

11. The method of claim 10, wherein applying heat to initiate polymerization of the phthalonitrile resin comprises heating to a temperature of 200° C. or greater to quick set the phthalonitrile resin.

12. The method of claim 9, further comprising grinding the phthalonitrile resin prior to mixing.

13. The method of claim 9, wherein mixing the phthalonitrile resin and the solvent comprises mixing via one or more of a shaker table, an overhead mixer, magnetic stirring, and a centrifugal mixer.

14. The method of claim 9, wherein mixing the conductive filler in the solvent comprises mixing for between 5 minutes to 90 minutes.

15. The method of claim 9, further comprising adding additional solvent after mixing the conductive filler, adding additional conductive filler, and then adding additional solvent.

16. The method of claim 9, wherein the phthalonitrile resin comprises a polyether ether ketone (PEEK) resin.

17. A method of making a high temperature resistive film and/or cured adhesive, the method comprising:
    applying a resistive ink comprising a phthalonitrile resin, a solvent, and one or more conductive fillers on a substrate;
    evaporating the solvent from the resistive ink; and
    curing the phthalonitrile resin on the substrate by activating a catalyst contained in the resistive ink.

18. The method of claim 17, wherein applying the resistive ink comprises applying via a doctor blade, a screen printing process, a roll-to-roll process, or a combination thereof.

19. The method of claim 17, wherein evaporating the solvent comprises evaporating the solvent via a hot plate, oven, a heat lamp, an infrared lamp, or a combination of two or more thereof and heating for 1 min to 3 min.

20. The method of claim 17, wherein curing the phthalonitrile resin comprises thermally curing the phthalonitrile resin at a temperature within a range of 150° C. to 400° C.

* * * * *